UNITED STATES PATENT OFFICE.

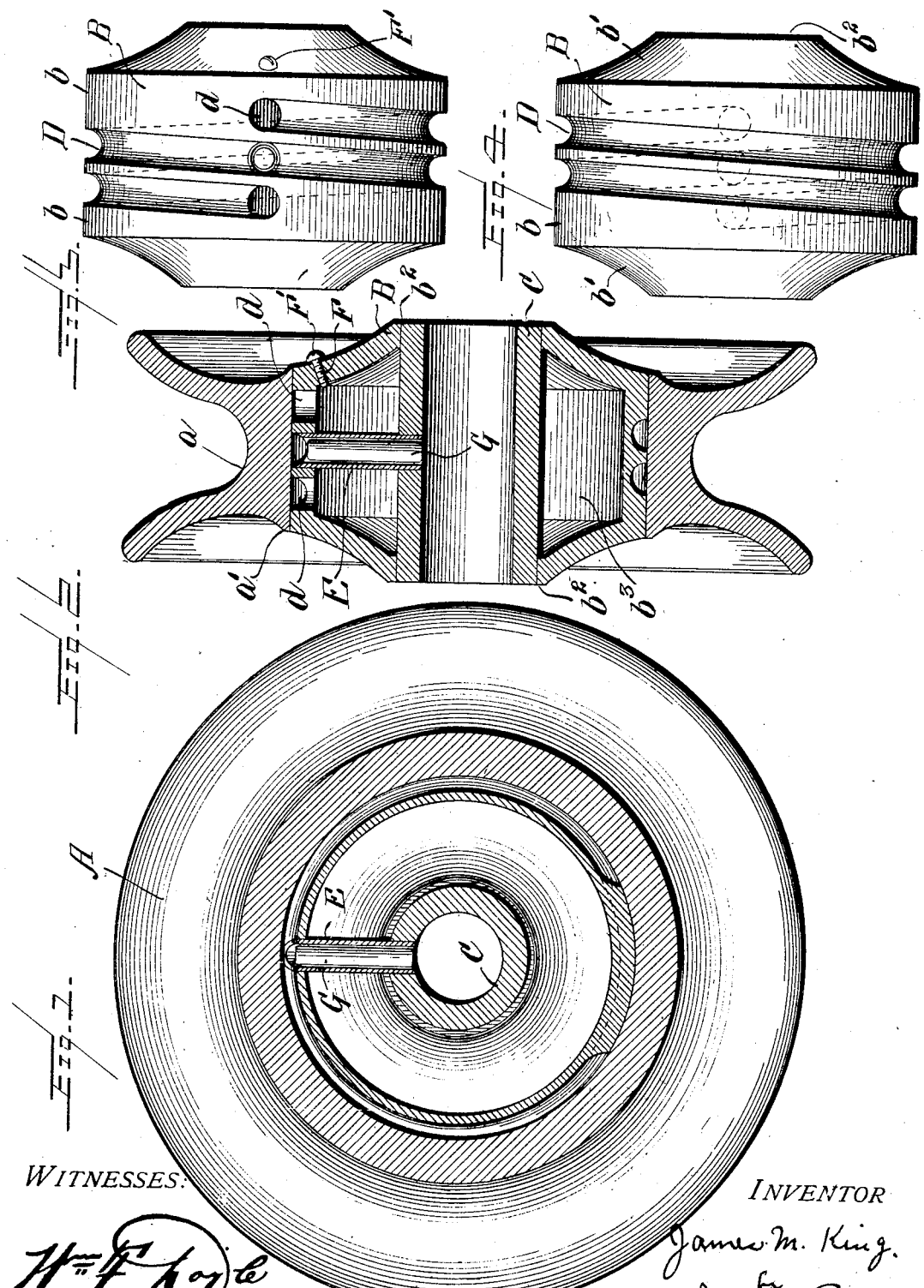

JAMES MILES KING, OF DANVILLE, VIRGINIA, ASSIGNOR, BY DIRECT AND MESNE ASSIGNMENTS, OF ONE-HALF TO H. S. LANIER, OF DANVILLE, VIRGINIA.

TROLLEY-WHEEL.

No. 829,073.　　Specification of Letters Patent.　　Patented Aug. 21, 1906.

Application filed May 31, 1906. Serial No. 319,593.

*To all whom it may concern:*

Be it known that I, JAMES MILES KING, a citizen of the United States, residing at Danville, in the county of Pittsylvania and State of Virginia, have invented certain new and useful Improvements in Trolley-Wheels; and I do hereby declare the following to be a full, clear, and exact description of the invention, such as will enable others skilled in the art to which it appertains to make and use the same.

My invention relates to new and useful improvements in the class of trolley-wheels, and more particularly to automatic means for keeping the axis thereof continually lubricated.

In order that my invention may be thoroughly understood, I have illustrated the same in the accompanying drawings, and a full and exact description thereof is contained in the annexed specification.

In the accompanying drawings, Figure 1 is a central vertical section through my improved wheel. Fig. 2 is a vertical transverse section through the same. Figs. 3 and 4 are edge views of the oil-cup.

In the several views like letters of reference designate similar parts of my improved construction.

A in the drawings designates the wheel, provided on its periphery with the annular groove $a$ and an orifice $a'$, concentric with the center of the wheel. B is an oil-retaining receptacle of circular form and of sufficient size to tightly fit into the orifice $a'$ of said wheel A. This oil-well B comprises a shell having a peripheral face $b$, adapted to engage with the inside of the orifice $a'$ of the wheel A, and outwardly-flaring sides $b'$ $b'$, provided with the orifices $b^2$ $b^2$, concentric with the center of the wheel A. C is a cylindrical bushing adapted to be driven through the orifices $b^2$ $b^2$ in said oil-well, forming an annular oil-tight chamber $b^3$ in said oil-well B. The peripheral face $b$ of said oil-well B is provided with the spiral groove D, preferably extending twice around the same. $d$ $d$ are radially-extending passages connecting the ends of said groove D with the oil-chamber $b^3$. E is a cylindrical passage extending through the oil-chamber $b^3$ and connecting said groove D midway between its ends with the interior of the bushing C. F is a threaded orifice in the side $b^2$ of said oil-chamber $b$ and is adapted to permit the inflow of a lubricant into said chamber and is provided with a threaded plug F'. G is a pin located in the tube E, the same being of slightly less diameter than the said tube and being sufficiently short not to obstruct the groove while bearing against the axis.

From the foregoing the operation of my device may be readily understood and is as follows, assuming the parts to be assembled as in Fig. 2, with the chamber $b$ filled with oil or other lubricant. As the wheel starts to rotate and while gaining motion the inlet to that part of the groove D which faces the direction of rotation will scoop up the oil, and as soon as the wheel begins to revolve rapidly the opposite inlet will begin to take in oil, and hence by centrifugal force the groove D will be kept full of oil during the rotation of the wheel. As the wheel takes up and loses motion in starting and stopping, the oil duct or tube E will fill with oil from the groove D. It is obvious that unless the oil is fed gradually from the duct E there would be a great waste of lubricant, and it is to overcome this difficulty that I place the pin G in said duct. The function of this pin is as follows: When the wheel is at a standstill or is just beginning to move, the position of the pin will be governed by the force of gravity, and hence as the wheel begins to rotate it will be forced according to the position of the passage E toward and away from the axis, and as the pin is slightly smaller than said passage the pin will act as a pump, forcing sufficient but not a superfluous amount of oil to the axis. When the wheel revolves at high speed, it is apparent that the pin will be thrown against the outer wall of the spiral passage, allowing the oil to flow more freely to the axis.

The operation will be the same in either direction in which the wheel revolves, and an increase or decrease of flow of lubricant may readily be secured by changing the size of the pin G. Furthermore, with this construction when either the wheel or bushing, or both, wear out they may be replaced upon the oil-well, thus utilizing the oil-well an indefinite number of times.

What I claim, and desire to secure by Letters Patent, is—

1. A trolley-wheel, having a central oil-well, a circular oil-passage around the exterior of said well and concentric with the center of the wheel, a radially-disposed inlet-port from said oil-well to said circular passage and a passage affording communication between said circular passage and the bearing portion of the wheel, substantially as described.

2. A trolley-wheel, having a central oil-well, a circular oil-passage around the exterior of said well and concentric with the center of the wheel, a radially-disposed inlet-port from said oil-well to said circular passage, a radially-disposed passage affording communication between said circular passage and the bearing portion of the wheel and a pin located in said radially-disposed passage, said pin being adapted to slide therein, substantially as described.

3. A trolley-wheel, having a central oil-well, a spiral oil-passage around the exterior thereof and concentric with the center of the wheel, a radially-disposed inlet-port from said oil-well to said spiral passage and a passage connecting said spiral passage with the bearing portion of the wheel, substantially as described.

4. A trolley-wheel, having a central oil-well, a spiral oil-passage around the same and concentric with the center of the wheel, radially-disposed inlets from said oil-well to the ends of said passage and an oil-passage connecting said spiral passage, midway between its ends, with the bearing portion of the wheel, substantially as described.

5. A trolley-wheel, having a central oil-well, a spiral oil-passage around the same and concentric with the center of the wheel, radially-disposed inlets from said oil-well to the ends of said passage, a radially-disposed passage connecting said spiral passage midway between its ends with the bearing portion of the wheel and a pin located in said radially-disposed passage, said pin being adapted to slide therein, substantially as described.

6. The combination with a trolley-wheel having a central opening, of a circular oil-well provided at its center with a bearing portion forming an annular oil-chamber around the same, said circular oil-well being fitted into said opening in said wheel, the peripheral face of said oil-well being provided with a spiral groove extending around the same, and forming an oil-passage between said oil-well and said wheel, radially-disposed inlet-ports from said oil-chamber to said groove and a passage connecting said groove with the interior of said bearing portion, substantially as described.

7. The combination with a trolley-wheel provided with a central opening, of a circular oil-well adapted to be driven into said opening in said wheel and having its walls provided with central openings, a bushing fitted in said openings in said oil-well, forming an annular oil-chamber around said bushing, the peripheral face of said oil-well being provided with a spiral groove extending around same and forming an oil-passage between said oil-well and said wheel, radially-disposed inlet-ports from said oil-chamber to said groove, and a passage connecting said groove with the interior of said bushing, substantially as described.

8. The combination with a trolley-wheel provided with a central opening, of a circular oil-well adapted to be driven into said opening in said wheel and having its walls provided with central openings, a bushing adapted to be driven through said openings in said oil-well, forming an annular oil-chamber around said bushing, the peripheral face of said oil-well being provided with a sprial groove extending around same forming an oil-passage between said oil-well and said wheel, radially-disposed inlet-ports from said oil-chamber to said groove, a radially-disposed passage connecting said groove with the interior of said bushing and a pin located in said passage and adapted to slide therein, substantially as described.

In testimony whereof I affix my signature in the presence of two witnesses.

JAMES MILES KING.

Witnesses:
JAS. D. HARRISON,
KENNETH WIMELEITH.